(12) United States Patent
Ré

(10) Patent No.: US 10,697,571 B2
(45) Date of Patent: Jun. 30, 2020

(54) BREAKAWAY HYDRAULIC COUPLER

(71) Applicant: Cla-Val Co., Costa Mesa, CA (US)

(72) Inventor: Daniel Ré, Les Agettes (CH)

(73) Assignee: Cla-Val Co., Costa Mesa, CA (US)

( * ) Notice: Subject to any disclaimer, the term of this patent is extended or adjusted under 35 U.S.C. 154(b) by 1315 days.

(21) Appl. No.: 14/856,227

(22) Filed: Sep. 16, 2015

(65) Prior Publication Data

US 2016/0116094 A1 Apr. 28, 2016

Related U.S. Application Data

(60) Provisional application No. 62/067,899, filed on Oct. 23, 2014.

(51) Int. Cl.

| | |
|---|---|
| *F16L 37/02* | (2006.01) |
| *F16L 55/10* | (2006.01) |
| *F16L 27/08* | (2006.01) |
| *F16L 37/23* | (2006.01) |
| *B67D 7/32* | (2010.01) |

(52) U.S. Cl.
CPC ............ *F16L 37/02* (2013.01); *B67D 7/3218* (2013.01); *F16L 27/0828* (2013.01); *F16L 55/1015* (2013.01); *F16L 37/23* (2013.01)

(58) Field of Classification Search
CPC ... F16L 37/02; F16L 27/0828; F16L 55/1015; F16L 37/23; F16L 37/22; F16L 27/0824; F16L 55/1133; F16L 29/005; F16L 29/007; F16L 37/086; F16L 25/06; F16L 19/04; F16L 2201/20; F16K 13/04; B67D 7/3218; E21B 17/06

USPC .. 285/1, 2, 3, 304, 316, 400, 317, 276, 277, 285/4; 137/67, 68.11, 68.14
See application file for complete search history.

(56) References Cited

U.S. PATENT DOCUMENTS

| | | | |
|---|---|---|---|
| 2,836,207 A * | 5/1958 | Griswold ................ | F16L 37/23 137/614 |
| 3,034,544 A | 5/1962 | Griswold | |
| 3,052,488 A * | 9/1962 | Bruning ................... | F16L 37/23 137/614.04 |
| 3,317,220 A * | 5/1967 | Bruning ................... | F16L 37/23 285/1 |
| 3,398,977 A * | 8/1968 | Rikizo ................ | F16L 37/0842 285/321 |
| 4,078,577 A | 3/1978 | Brown | |
| 4,348,039 A | 9/1982 | Miller | |
| 4,691,941 A | 9/1987 | Rabushka et al. | |

(Continued)

*Primary Examiner* — Zachary T Dragicevich
*Assistant Examiner* — William S. Choi
(74) *Attorney, Agent, or Firm* — Kelly & Kelley, LLP

(57) ABSTRACT

A breakaway hydraulic coupler includes a coupler body assembly removably attachable to a fluid hydrant by a first lock member thereof. A sleeve assembly is connected to the coupler body assembly and includes a second lock member selectively movable into engagement with the first lock member to move the first lock member into locked position to attach the coupler body to the fluid hydrant. Upon an application of a load external to the hydraulic coupler exceeding a predetermined amount, the first lock member applies a sufficient force to the second lock member to cause a region of weakness of the second lock member to displace, allowing the first lock member to move to the unlocked position and the hydraulic coupler to detach from the hydrant.

48 Claims, 13 Drawing Sheets

(56) References Cited

U.S. PATENT DOCUMENTS

| | | | | |
|---|---|---|---|---|
| 5,145,213 A * | 9/1992 | Marrison | ............... | F16L 35/00 |
| | | | | 285/2 |
| 5,230,538 A * | 7/1993 | Kobayashi | ............. | F16L 37/23 |
| | | | | 285/316 |
| 6,056,010 A * | 5/2000 | Wells | ...................... | F16L 37/34 |
| | | | | 137/614 |
| 6,497,120 B1 * | 12/2002 | Kozora | ................ | C03B 9/1932 |
| | | | | 29/428 |
| 2010/0065132 A1 | 3/2010 | Wong | | |

* cited by examiner

BREAKAWAY HYDRAULIC COUPLER

RELATED APPLICATION

This application claims the benefit of U.S. Provisional Application No. 62/067,899, filed on Oct. 23, 2014.

BACKGROUND OF THE INVENTION

The present invention generally relates to hydraulic coupler devices, such as those used in connection with aviation fuel service. More particularly, the present invention relates to a hydraulic coupler that is designed to break away from a fluid hydrant when experiencing an excessive external pull or load.

The Energy Institute and the American Petroleum Institute (EI and API) provides specifications which outline the requirements for products intended for equipment used in aviation turbine fuel service or for products used in the process of fueling aircraft. Prior to 2001, the specifications had a requirement for hydrant couplers where the coupler had to be able to withstand a pull force of two thousand pounds without breaking or decoupling from the hydrant pit valve. There was no requirement that the coupler break away. The intent of this original requirement was to simulate a possible condition where the coupler would be connected to a system piping and the fueling truck would either drive away or run into the coupler while it was connected. The two-thousand-pound pull test verified that the coupler could withstand the possibility of such an incident.

In 2001, the EI and API specifications were revised such that at an excessive pull force between 4,000-5,000 pounds the coupler was required to break away from the pit valve hydrant without damaging the hydrant or preventing the pit valve from closing. Requiring breakaway is intended to prevent fuel spillage into the fueling vault and/or onto the airport tarmac and minimize the potential for damaging underground piping, as repairing underground piping is considered more costly and time consuming than replacing a hydrant.

A breakaway coupler exists wherein the locking mechanism includes notched latching lugs. The notched latching lugs grip a flange of the pit valve hydrant to secure the two components together during a fueling operation. These notches create high stressed concentrated areas on the latch that can predictably break under given load conditions. Although this breakaway design works, the notches on the lug latches are directly loaded against all internal pressure forces as well as external physical forces. The notches can fatigue over time, which weakens the breakaway feature such that over time it has the potential of breaking away at less than the required external load force. This direct loading from internal fluid pressure results in higher forces acting on the latches which can contribute to a shorter fatigue life, requiring that the wear or condition of the latches be closely monitored. To avoid the potential for breakaway at a lower than desired load force, the notched latches should be periodically inspected and/or replaced. Since all of the latches are notched, this requires that each individual latch be stressed. Manufacturing variations in the notch detail of the latches can result in variations in the strength of each latch, which varies the failure load force value. Couplers currently in the marketplace use eight or more latches on their couplers and, given the nature of the type of breakaway design with multiple components of failure, could make the actual breakaway pull force of the coupler difficult to predict. Manufacturing processes are critical to ensure the material and dimensional details of the individual latches are consistent for each coupler assembly.

Accordingly, there is a continuing need for a breakaway hydraulic coupler which will reliably break away from a fluid hydrant at the desired minimum load force, does not have a shorter fatigue life due to being directly loaded against all internal pressure and external physical forces, and which will have a predictable breakaway load force. The present invention addresses these needs, and provides other related advantages.

SUMMARY OF THE INVENTION

The present invention relates to a hydraulic coupler which is designed to break away from a fluid hydrant, such as a fuel pit valve hydrant, when experiencing an external load force applied thereto which exceeds a predetermined amount. The breakaway hydraulic coupler reliably breaks away from the fluid hydrant at the desired minimum load force, and does not have a shorter fatigue life due to being directly loaded against all internal pressure and external physical forces.

The breakaway hydraulic coupler comprises a coupler body assembly removably attachable to a fluid hydrant, to form a fluid pathway therewith. The fluid hydrant may be a fuel pit valve hydrant.

The coupler body assembly has at least one first lock member movable between a locked position and an unlocked position. The at least one first lock member may be at least partially disposed within a cavity of the coupler body assembly, so as to at least partially extend out of the cavity as the at least one first lock member is moved into the locked position. The at least one first lock member may comprise a plurality of spaced apart first lock members, each at least partially disposed within a cavity of the coupler body assembly. The first lock members may have a generally spherical configuration.

A sleeve assembly is connected to the coupler body assembly. The sleeve assembly includes a second lock member having a region of weakness. The second lock member is selectively movable into engagement with the at least one first lock member to move the at least one first lock member into a locked position and attach the coupler body to the hydrant. The second lock member is also movable out of engagement with the at least one first lock member to allow the at least one first lock member to move into the unlocked position and permit the coupler body to detach from the fluid hydrant. The sleeve assembly may be slidably connected to the coupler body so as to selectively move the second lock member into and out of engagement with the at least one first lock member.

The second lock member may include a plurality of regions of weakness. The regions of weakness may be generally equally spaced apart from one another. The one or more regions of weakness of the second lock member may comprise a reduced cross-sectional area forming a fracturable ligament.

The second lock member may comprise a fracture ring. The fracture ring may be disposed within a groove of the sleeve assembly.

Upon an application of a load external to the hydraulic coupler exceeding a predetermined amount, the at least one first lock member applies a sufficient force to the second lock member to cause the region of weakness of the second lock member to displace or fracture, allowing the at least one first lock member to move from the locked position to the unlocked position and the hydraulic coupler to detach from the hydrant. The strength of the region of weakness of the second lock member is calculated to displace or break when a predetermined load is applied to the second lock member by the at least one first lock member.

The second lock member is aligned relative to the at least one first lock member so as to evenly distribute a force from the at least one first lock member to the one or more regions of weakness of the second lock member. In the case when there is a plurality of first lock members, they are aligned with the second lock member such that the first lock members do not directly contact the one or more regions of weakness of the second lock member. The one or more regions of weakness of the second lock member are positioned an equal distance between adjacent first lock members.

Pressure forces caused by fluid flowing through the hydraulic coupler are not directly imparted, or are nominally and minimally imparted, to the second lock member. Thus, the breakaway hydraulic coupler does not have a shorter fatigue life due to being directly loaded against all internal pressure forces.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a breakaway hydraulic coupler, generally referred to herein by the reference number 100, which is selectively attachable to a fluid hydrant, such as a fuel pit valve hydrant, and configured and designed so as to unlock and break away when an external load is applied that exceeds a predetermined level. The hydraulic coupler is also configured and designed such that pressure forces caused by fluid flowing through the hydraulic coupler are not directly imparted, or only nominally imparted, to a locking member thereof which is configured and designed so as to displace or break when the hydraulic coupler experiences excessive external forces.

Figure 1:
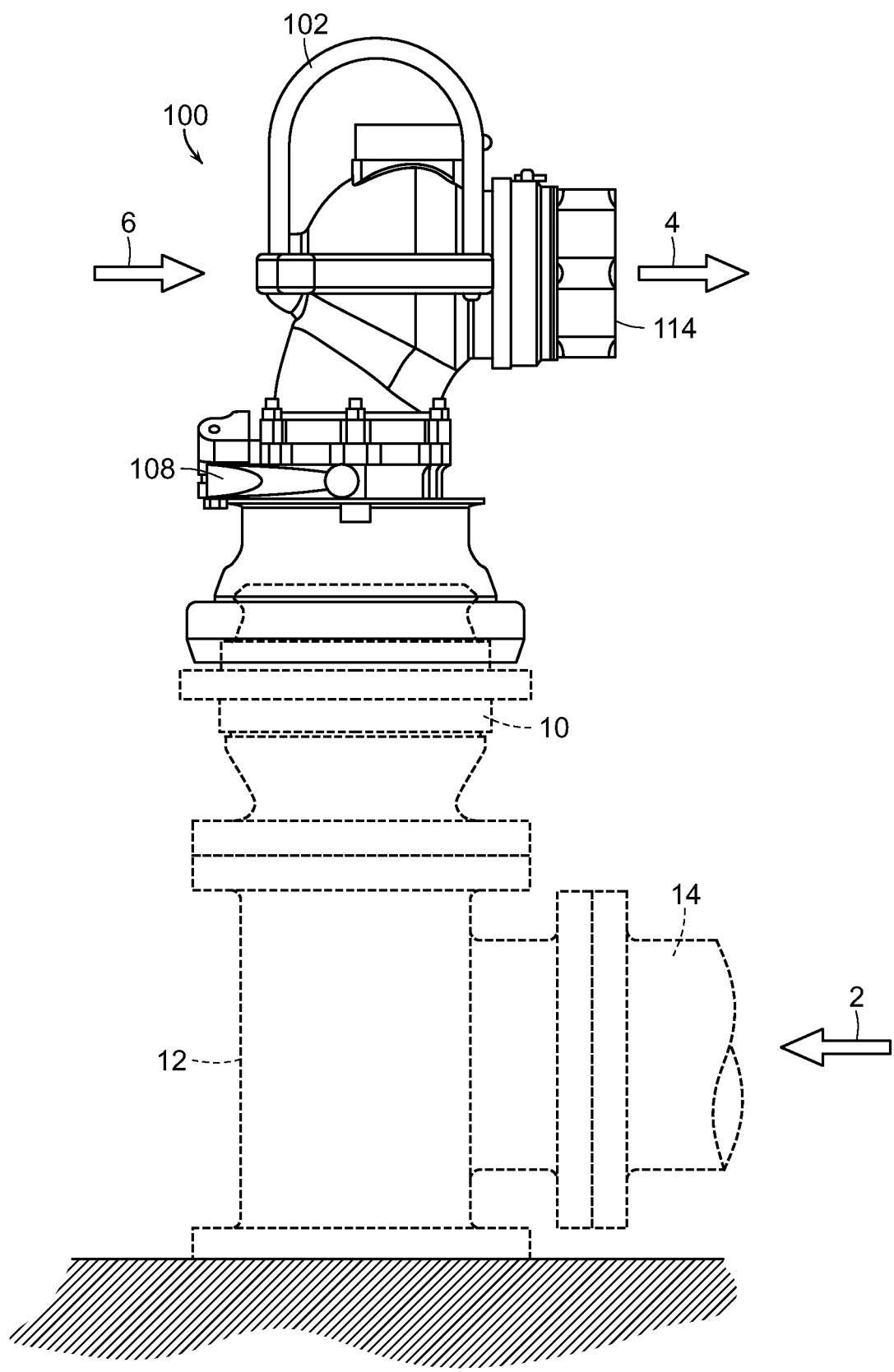
FIG. 1 is a side view of a breakaway hydraulic coupler embodying the present invention connected to a fluid hydrant, in accordance with the present invention.

With reference now to FIG. 1, a fluid hydrant 10 is shown operably attached to a pipe 12 which is in fluid communication with a desired fluid. In a typical application, the fluid hydrant 10 comprises a fuel pit valve hydrant which is in fluid communication with fuel, typically jet fuel, such as from an underground source of jet fuel or by means of piping extending to a jet fuel tank. The jet fuel fluid is pumped, or otherwise under pressure, such that when the hydrant valve is open jet fuel will flow therefrom through an attached coupler and hose to an aircraft or other vehicle to be fueled.

With continuing reference to FIG. 1, a breakaway hydraulic coupler 100 embodying the present invention is shown operably connected to the fluid hydrant valve 10. Arrows labeled with reference numbers "2" and "4" illustrate the flow of fluid, such as jet fuel or the like, into an inlet 14 of the hydrant pit valve pipe 12 and/or hydrant itself 10, which when opened, passes through the hydraulic coupler 100 and through attached piping or tubing (not shown) to be delivered as needed, such as to a movable fuel tanker, fuel tank of an aircraft, or the like. The arrow labeled with the reference number "6" shows the potential for an external force to be applied to the hydraulic coupler 100. This can include an external impact force, such as a vehicle running into the hydraulic coupler 100, or a pulling force, such as a vehicle driving away from the hydraulic coupler 100 while the hose line or downstream conduit is still attached. It is desirable when such forces exceed a specified load that the coupler device 100 automatically detach and break away from the hydrant valve 10 so as to prevent damage or destruction of the hydrant valve 10 and/or attached piping 12. Current specifications state that an excessive pull force between 4,000-5,000 pounds requires that the coupler 100 break away from the pit valve (fluid hydrant valve 10 and piping 12) such that the pit valve will close and prevent damage to the pit valve.

Figure 2:
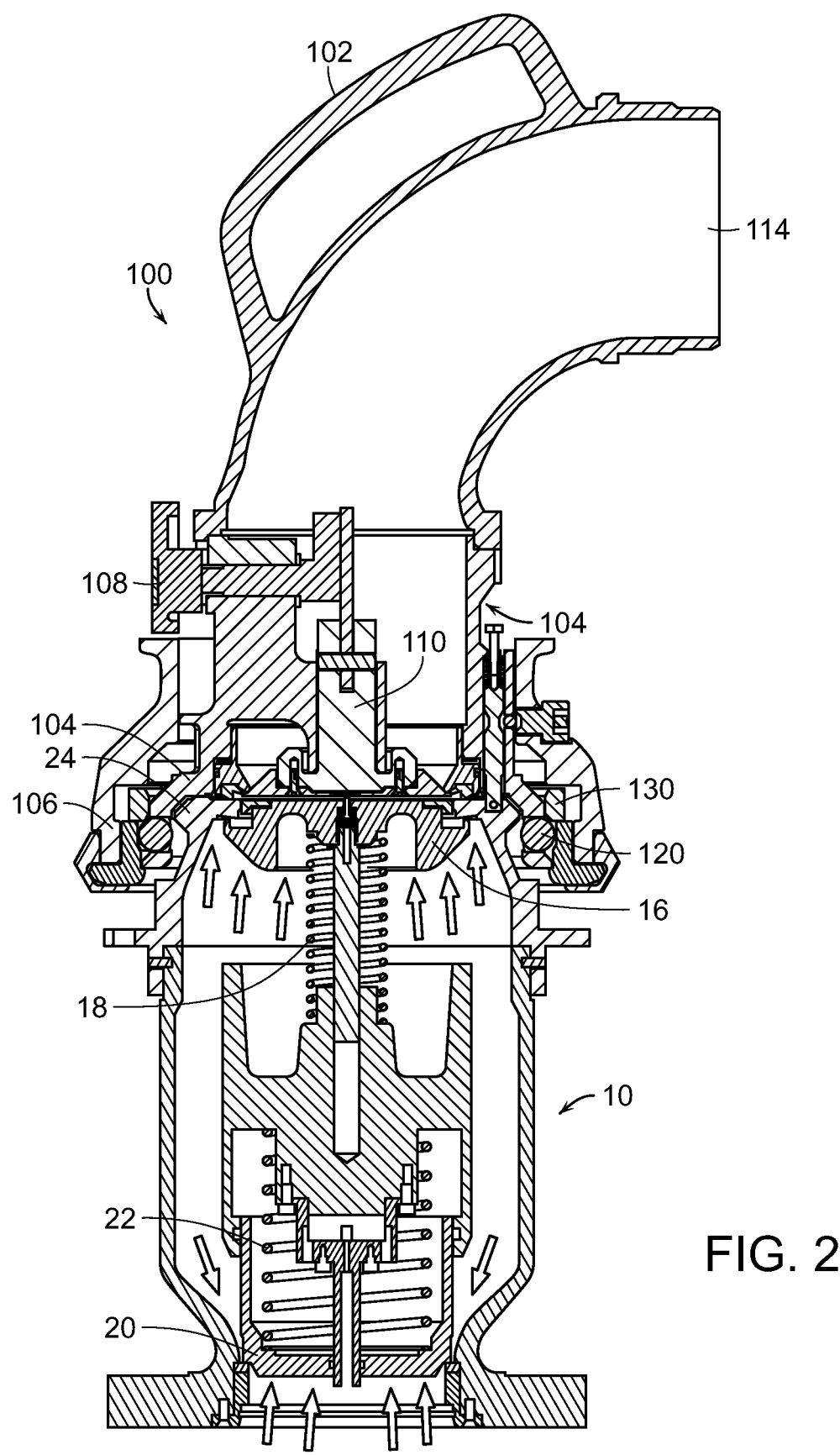
FIG. 2 is a cross-sectional view similar to FIG. 1, illustrating the hydraulic coupler of the present invention connected to the fluid hydrant, which is closed.

With reference now to FIG. 2, as will be more fully described herein, the hydraulic coupler 100 of the present invention is selectively attachable to the fluid hydrant valve 10. An exemplary design and configuration of a fluid hydrant valve 10 is shown. As mentioned above, the fluid hydrant 10 is coupled fluidly to a source of fluid, such as jet fuel or the like. The fluid hydrant 10 may be coupled to the source of fluid by means of other piping, such as pipe 12 illustrated in FIG. 1, or may extend directly from a source of the fuel, such as an underground fuel tank or the like. The fluid hydrant 10 is typically biased in the closed position, such that a poppet or valve 16 thereof is biased into a closed position, such as by means of spring 18. This prevents the fluid, shown by arrows within the fluid hydrant 10, from leaving the hydrant 10 unless the hydrant 10 is intentionally opened. The fluid hydrant 10 may include a valve or stop 20 to prevent fluid from flowing into the fluid hydrant 10 unless the hydrant 10 is opened. This also may be normally biased into a closed position, such as by means of spring 22. With the fluid hydrant 10 in the closed position, fluid, such as jet fuel, cannot exit the fluid hydrant valve 10.

Figure 3:
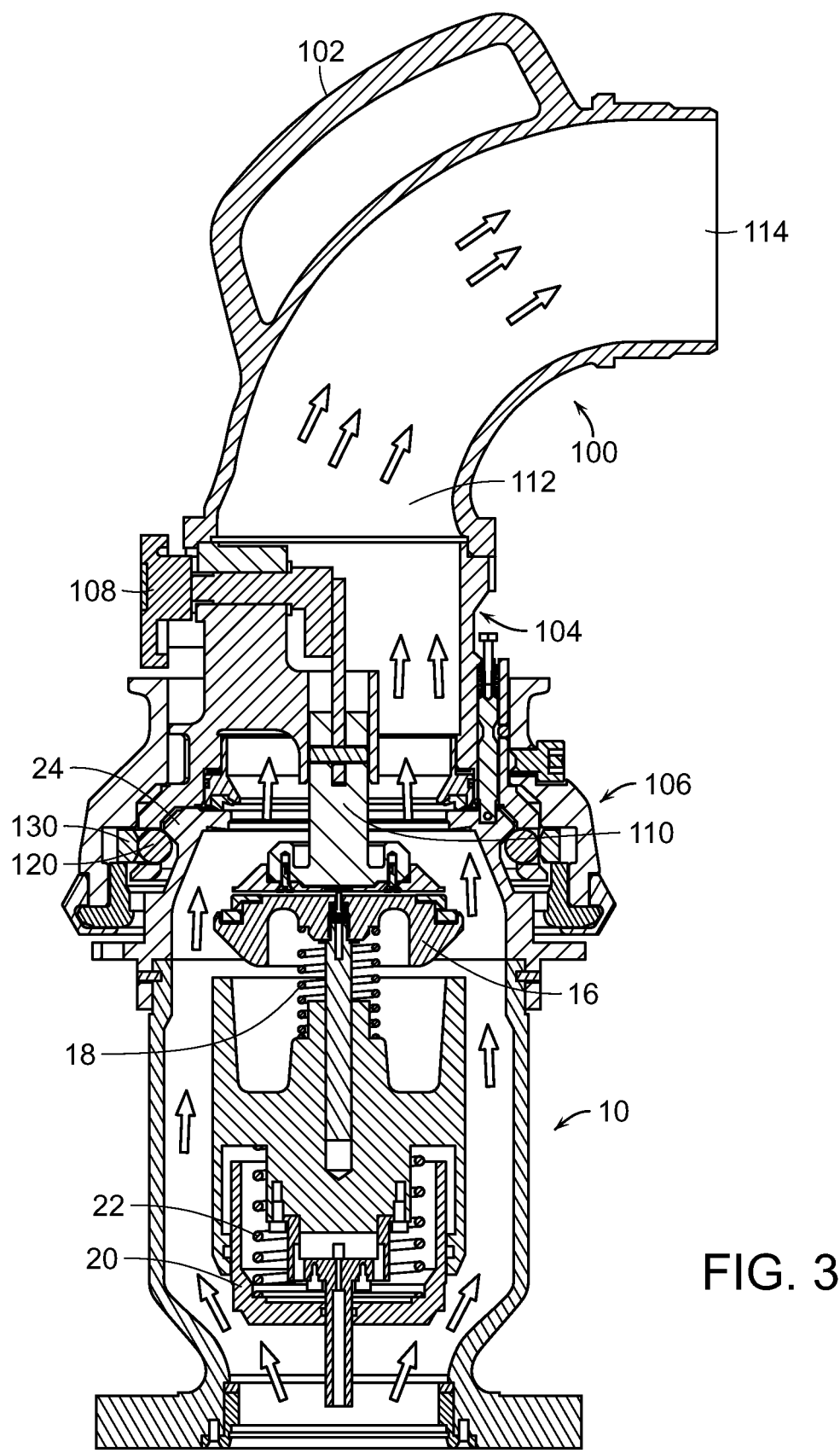
FIG. 3 is a cross-sectional view similar to FIG. 2, but illustrating the opening of the fluid hydrant so as to pass fluid therefrom and through the hydraulic coupler of the present invention.

With reference to FIGS. 2 and 3, the hydraulic coupler 100 of the present invention is designed and configured so as to be selectively attached and coupled to the fluid hydrant valve 10. Typically, the hydraulic coupler 100 includes one or more handles 102 for manually moving and positioning the hydraulic coupler. The hydraulic coupler 100 includes a coupler body assembly having at least one first lock member and a sleeve assembly 106 having a Page 10 of 29 second lock member, the sleeve assembly 106 being selectively moved between unlocked and locked positions so as to unlock or lock the coupler body assembly 104 to the fluid hydrant 10.

After the hydraulic coupler 100 has been connected to and locked in place with respect to the fluid hydrant 10, the valve 16 of the fluid hydrant 10 can be opened, such as by actuating and/or turning handle 108, which vertically moves pusher 110 downwardly to open the valve 16 against the bias of spring 18 and allow the fluid, shown by the arrows in FIG. 3, to flow through the passageway 112 of the hydraulic coupler 100 and out outlet 114, which typically has a hose or other piping attached thereto for delivering the jet fuel or other fluid where needed. As mentioned above, in the case of a jet fuel hydrant pit valve, the jet fuel fluid is pumped, or otherwise under pressure, such that when the fluid hydrant valve 16 is open, jet fuel will flow therefrom through the hydraulic coupler 100 and into a hose and an aircraft or other vehicle to be fueled.

It will be appreciated by those skilled in the art that there are a variety of mechanisms and means for biasing the fluid hydrant into a normally closed state and for selectively opening the fluid hydrant 10 after the hydraulic coupler 100 is attached thereto. Thus, means other than those illustrated and described are contemplated by the present invention.

A connecting mechanism locks the hydrant valve 10 and the coupler 100 together so fluid can pass through the connection without leaking. While connected, fluid pressure exerts a force that would separate the two components if they weren't locked together. There are a variety of mechanisms that employ different methods for connecting or locking the components together. While locked together, most coupler locking mechanisms are stronger than the piping infrastructure. Thus, if the coupler were to receive an accidental external impact force or pulling force, the piping anchor points would fail before the coupler connection would break. In the past, this has damaged piping infrastructure which could be costly to replace, and any damage could also create leaks in the piping system. To avoid these problems, the coupler device 100 of the present invention is designed to breakaway before damage to the piping infrastructure.

Figure 4:
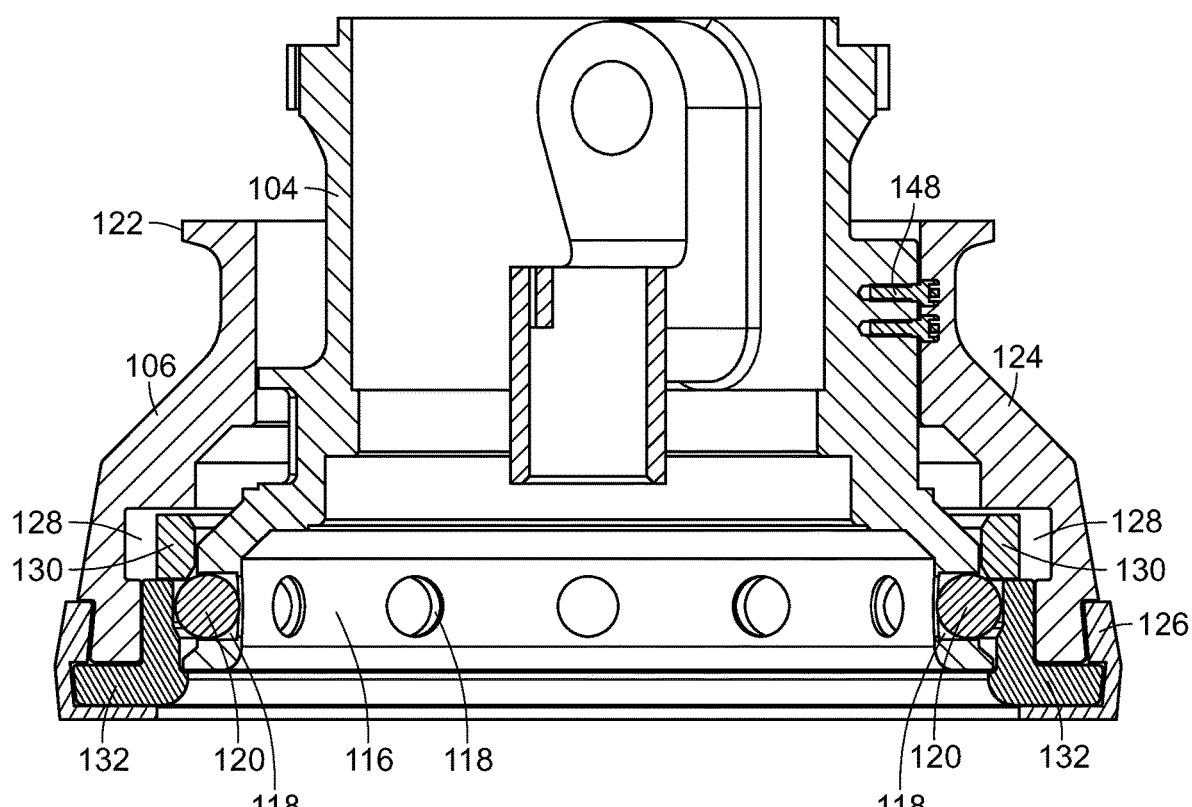
FIG. 4 is a cross-sectional view of a sleeve assembly and a coupler body assembly of the present invention.
Figure 5:
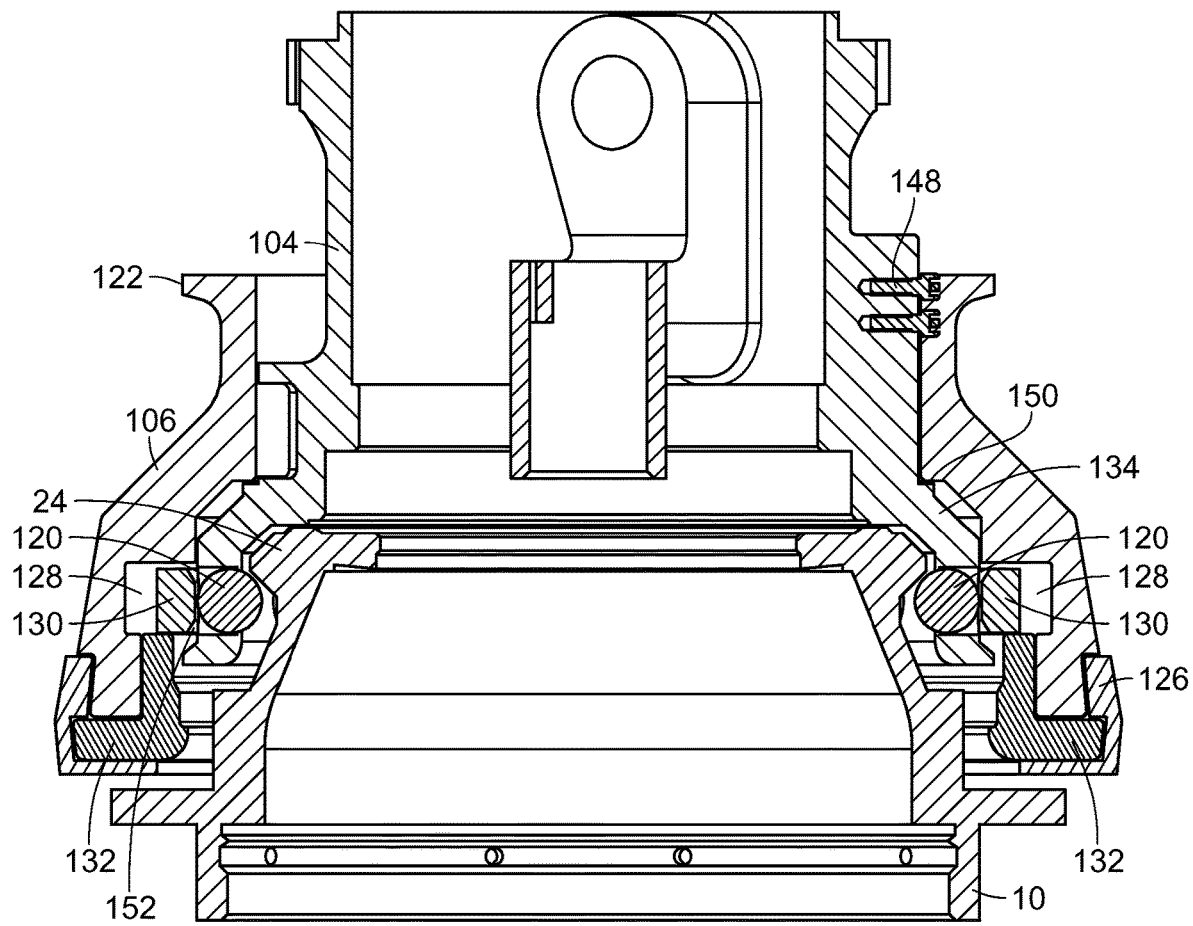
FIG. 5 is a cross-sectional view similar to FIG. 4, illustrating the sleeve assembly being moved into a locking position so as to lock the hydraulic coupler to a fluid hydrant, in accordance with the present invention.

With reference now to FIGS. 4 and 5, the coupler body assembly 104 and the sleeve assembly 106 are shown. In FIG. 4, the sleeve assembly 106 is in its raised, unlocked position. However, in FIG. 5, the sleeve assembly 106 has been moved into a locked position, wherein the hydraulic coupler 100 is securely connected and locked to the fluid hydrant valve 10. In a particularly preferred embodiment, as illustrated, the sleeve assembly 106 is slidably associated with and connected to the coupler body assembly 104, and can be manually raised and lowered so as to release and lock the hydraulic coupler 100 to the fluid hydrant 10.

The coupler body assembly 104 at least partially defines the fluid passageway 112 through the hydraulic coupler 100. The coupler body assembly 104 includes at least one first lock member which is selectively movable between a locked position and an unlocked position, as will be more fully described herein. The coupler body assembly 104 is directly attached to a portion of the fluid hydrant valve 10.

In one embodiment, a lower portion 116 of the coupler body has a plurality of apertures or cavities 118 formed therein in spaced apart relation. The first lock members 120 are at least partially disposed within the spaced apart cavities or apertures 118 and capable of being moved inwardly so as to engage and lock with a portion of the fluid hydrant valve 10, as illustrated in FIG. 5. In the illustrated embodiment, the first lock members are generally spherical balls 120 having a degree of movement in the cavity or aperture such that an inwardly facing portion of the locking member balls 120 can be moved inwardly and disposed below a rim or ledge 24 of the fluid hydrant valve 10 so as to engage and lock the hydraulic coupler 100 to the fluid hydrant valve 10. However, when not pushed inwardly, the first lock member balls 120 can move outwardly such that the locking balls 120 disengage from the ledge or rim 24 of the fluid hydrant valve 10 and the hydraulic coupler 100 can be removed from the fluid hydrant 10. The apertures or cavities 118 can be configured so as to permit the limited movement of the locking balls 120, while not permitting the locking balls 120 from completely leaving the cavity or aperture 118.

When the sleeve assembly, which encircles the coupler body assembly 104 and is slidably attached thereto, is in an unlocked position, the first locking member balls 120 are able to freely move within a given range within the cavities 118 formed in the coupler body assembly 104. However, when the sleeve assembly 106 is moved from the unlocked position to a locked position, the first locking member balls 120 are forced inwardly into the cavities 118 so as to extend therefrom inwardly and be positioned below rim or ledge 24 of the fluid hydrant valve 10 and form a locking engagement therewith, as illustrated in FIG. 5.

With reference now to FIGS. 4-7, the sleeve assembly 106 includes a grip 122, such as the outwardly extending flange 122, which enables the operator of the coupler 100 to selectively lift the sleeve assembly 106 upwardly and push the sleeve assembly 106 downwardly into an engaged and locking position. The sleeve assembly includes a sleeve body 124 which may have a bumper 126 disposed about a lower portion thereof for protecting both the sleeve assembly 106 and the coupler body assembly 104 in the case of accidental contact with surrounding items.

The sleeve assembly 106 includes a second lock member which is selectively movable into engagement with the at least one first lock member to move the at least one first lock member, such as the illustrated locking balls 120, into a locked position to attach the coupler body assembly 104 to the fluid hydrant. In a particularly preferred embodiment, the sleeve body 124 has an open-faced groove 128 formed therein into which at least partially resides a fracture ring 130, which comprises the second lock member. The fracture ring 130 is held in place within the sleeve body 124 by means of a fracture ring retainer 132. The fracture ring retainer 132 is held in place by means of screws 134.

Means are provided to selectively lock the sleeve assembly 106 in the upward and disengaged or unlocked position with respect to the coupler body assembly 104, such that the effects of gravity or the like do not cause the sleeve assembly 106 to inadvertently slide downwardly into the engaged or locked position. Such a mechanism could comprise, for example, a latching screw 136 which could be manually operated by the user so as to selectively engage and disengage a bolt or screw into and out of engagement with the coupler body assembly 104 so as to hold the sleeve assembly 106 in an upward, unlocked position when desired.

Figure 8:
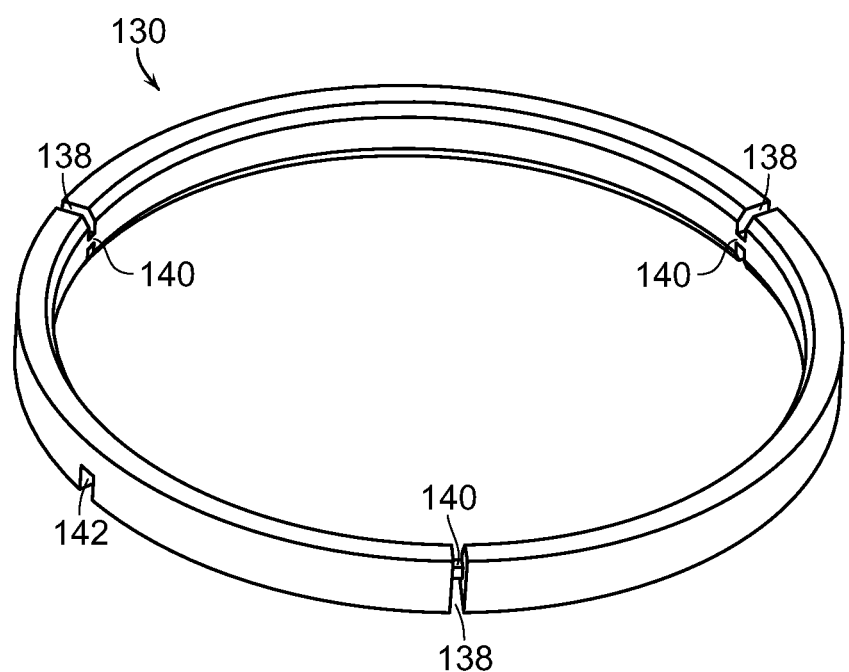
FIG. 8 is a perspective view of a fracture ring lock member of the present invention.

With reference now to FIG. 8, an exemplary fracture ring 130 is shown. The fracture ring 130 includes one or more regions 138 of weakness. These regions of weakness 138 are typically comprised of a reduced cross-sectional area forming a fracturable ligament 140. The ligament 140 is of a reduced cross-sectional area as compared to the remainder of the fracture ring 130.

When an external load is applied to the hydraulic coupler 100, these forces are transferred to the fracture ring 130, and when the load exceeds a predetermined amount, the ligament 140 within the reduced cross-sectional region displaces and breaks. The fracture ring 130 is allowed to expand outwardly within the groove 128 to a certain extent until the forces exceed the predetermined amount, at which time one or more of the ligaments 140 will fracture and break causing the fracture ring 130 to displace and the first locking member balls 120 to move outwardly and disengage from the ledge or rim 24 of the fluid hydrant 10, allowing the hydraulic coupler 100 to disconnect and be pushed or pulled away from the hydrant valve 10. As discussed above, the hydrant valve 10 may be designed and configured so as to automatically shut off due to the bias of the valve or poppet thereof when the hydraulic coupler 100 is disengaged from the hydrant valve 10.

The region of weakness 138 may be specifically engineered and designed so as to be capable of withstanding up to a predetermined force and load. The ligament 140 can be of varying cross-sectional configurations and thicknesses so as to withstand differing forces and loads. Thus, the slots or segments of reduced-cross-section 138 are used to create weak spots in the fracture ring 130 that will fail or break under predictable stress load conditions. The geometry of the reduced section segment or slot 138 and resulting ligament 140 can be designed so as to break under a given load condition. If a different load condition is required, the configuration and geometry of the slot or reduced cross-sectional area 138 and the resulting ligament 140 can be adjusted accordingly, so as to be able to withstand higher or lower external loads.

As few as one region of weakness 138 defining a fracturable ligament 140 can be formed in the fracture ring 130, or multiple such regions of weakness 138 can be formed in the fracture ring 130, as illustrated in FIG. 8. A single region of weakness 138 enables the designer to create a breakaway scenario with a great deal of predictability under a given load. However, multiple such regions of weakness can also be employed with a given arrangement such that the regions 138 are spaced apart from each other in such a manner, for example, being equidistant from one another, so as to also yield a breakaway condition under predictable external loads.

Thus, while FIG. 8 illustrates a fracture ring 130 having three regions of weakness 138 and a corresponding three fracturable ligaments 140, it will be appreciated that a single region of weakness or additional regions of weakness may be formed. Multiple regions of weakness may be employed to add symmetry to the fracture ring 130 so that stress loads are more evenly distributed. This is particularly appropriate if external impact forces could be delivered in multiple orientations or directions.

The number and geometry of the regions of weakness 138 can be varied to achieve uniform breakaway results in different orientations or directions. Moreover, evenly spaced regions of weakness 138 allow for even distribution of stresses so external forces can be applied in any direction. Evenly spaced regions of weakness 138 results in a constant breakaway force regardless of applied external force direction. Likewise, a single region of weakness 138 may be sufficient for some cases. A single region of weakness 138 still stresses in all load directions, but load distribution may not be symmetrical, meaning external breakaway forces in opposing directions could give different breakaway results. Nevertheless, the hydraulic coupler 100 will still break away even with a single region of weakness within the fracture ring 130.

Preferably, the regions of weakness 138 and fracturable ligaments 140 are aligned and oriented with respect to the first locking member balls 120 so that the load from the locking balls 120 applied to the fracture ring 130 is more evenly distributed allowing for a more predictable breakaway force. Preferably, the regions of weakness 138 and fracturable ligaments 140 are oriented halfway between adjacent locking balls 120.

Figure 6:
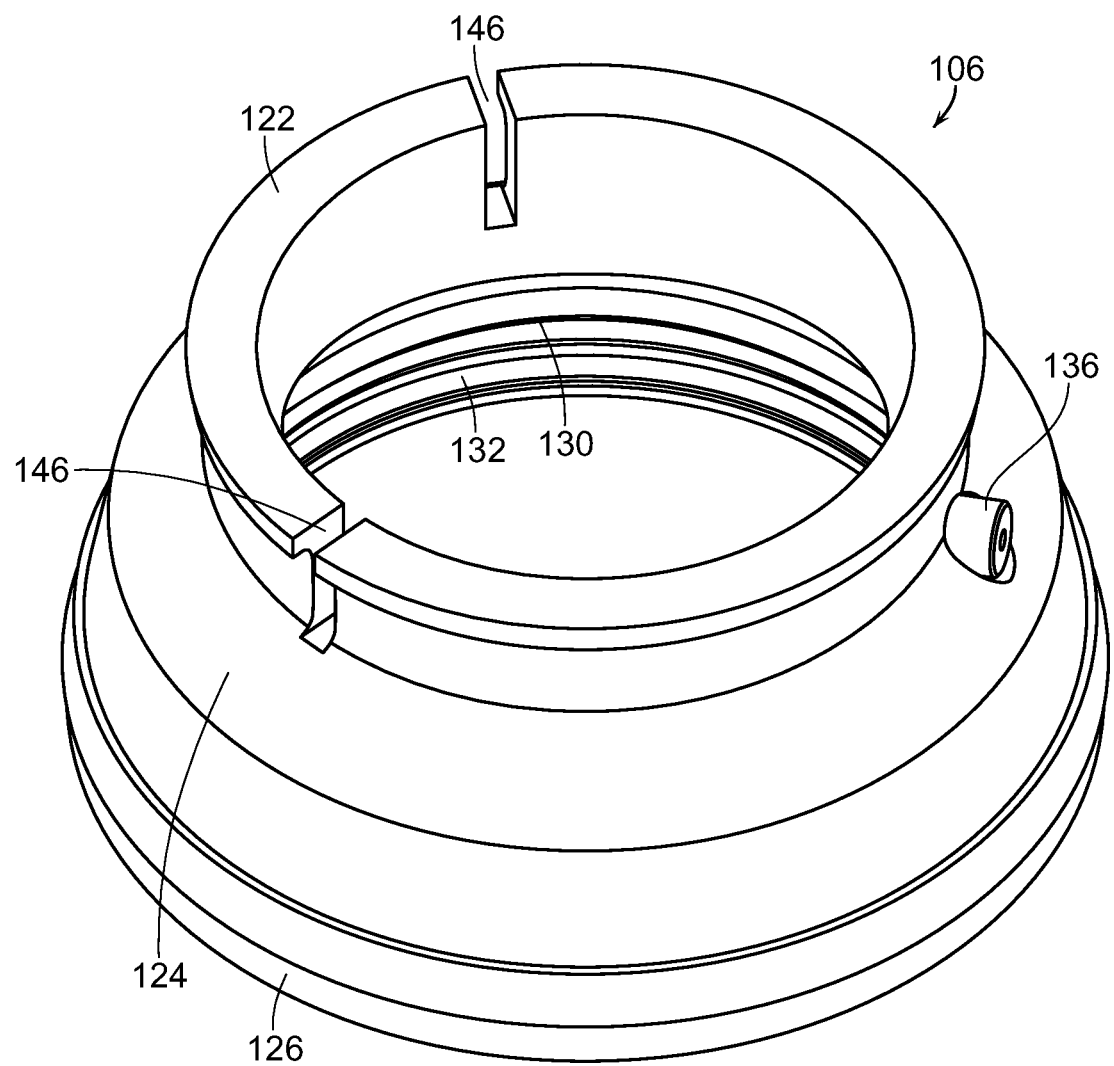
FIG. 6 is a top perspective view of a sleeve assembly embodying the present invention.
Figure 7:
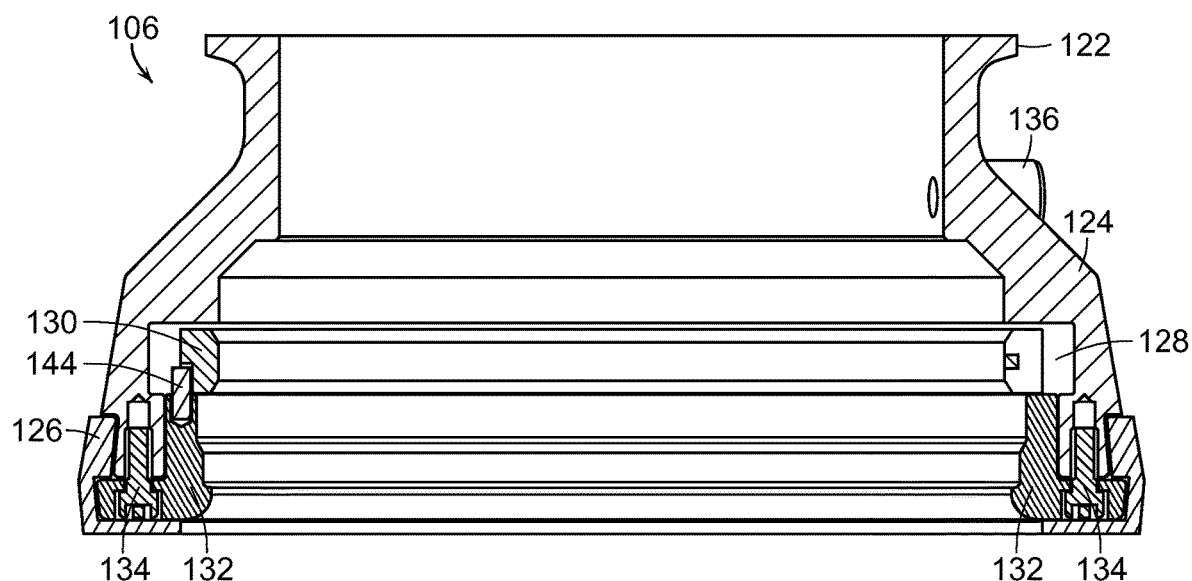
FIG. 7 is a cross-sectional view of the sleeve assembly of FIG. 6.

With reference to FIGS. 6-8, in order to achieve such orientation and alignment, the fracture ring 130 includes an alignment slot 142 which engages an alignment pin 144 of the sleeve assembly 106 so that the fracture ring 130 is placed in and retained in a given orientation and position, and rotation is prevented, such that the first locking member balls 120 are properly distributed and do not directly contact the region of weakness or fracturable ligament 138 and 140. This allows the locking balls 120 to apply an even force to the fracture ring 130. Moreover, in order to align the sleeve assembly 106 with the coupler body assembly, slots 146 are formed in the sleeve body 124 through which pins or screws 148 can be extended into the coupler body assembly 104. This aligns the sleeve body assembly 106 with the coupler body assembly 104 and ensures that the first locking member balls 120 are properly distributed and aligned with the fracture ring 130 so as to not directly contact a region of weakness or a fracturable ligament 138, 140 and more evenly distribute a load to the fracture ring 130 when an external load or force is applied to the hydraulic coupler 100. The elongated slots 146 and pin 148 arrangement prevents rotation of the sleeve assembly 106 with respect to the coupler body assembly 104, but still allows the sleeve assembly 106 to be slidably raised and lowered. Thus, the proper orientation and positioning of the fracture ring 130 with respect to the locking balls 120 is maintained.

With reference again to FIG. 4, the coupler body assembly 104 and the sleeve body assembly 106 are shown in their disengaged and unlocked positions. That is, the sleeve assembly 106 is in its raised and unlocked or disengaged position such that the fracture ring 130, comprising the second locking member, and the locking balls 120, comprising the first lock members, are not engaged with one another and the locking balls 120 have a degree of freedom of movement within the cavities 118.

Figure 9:
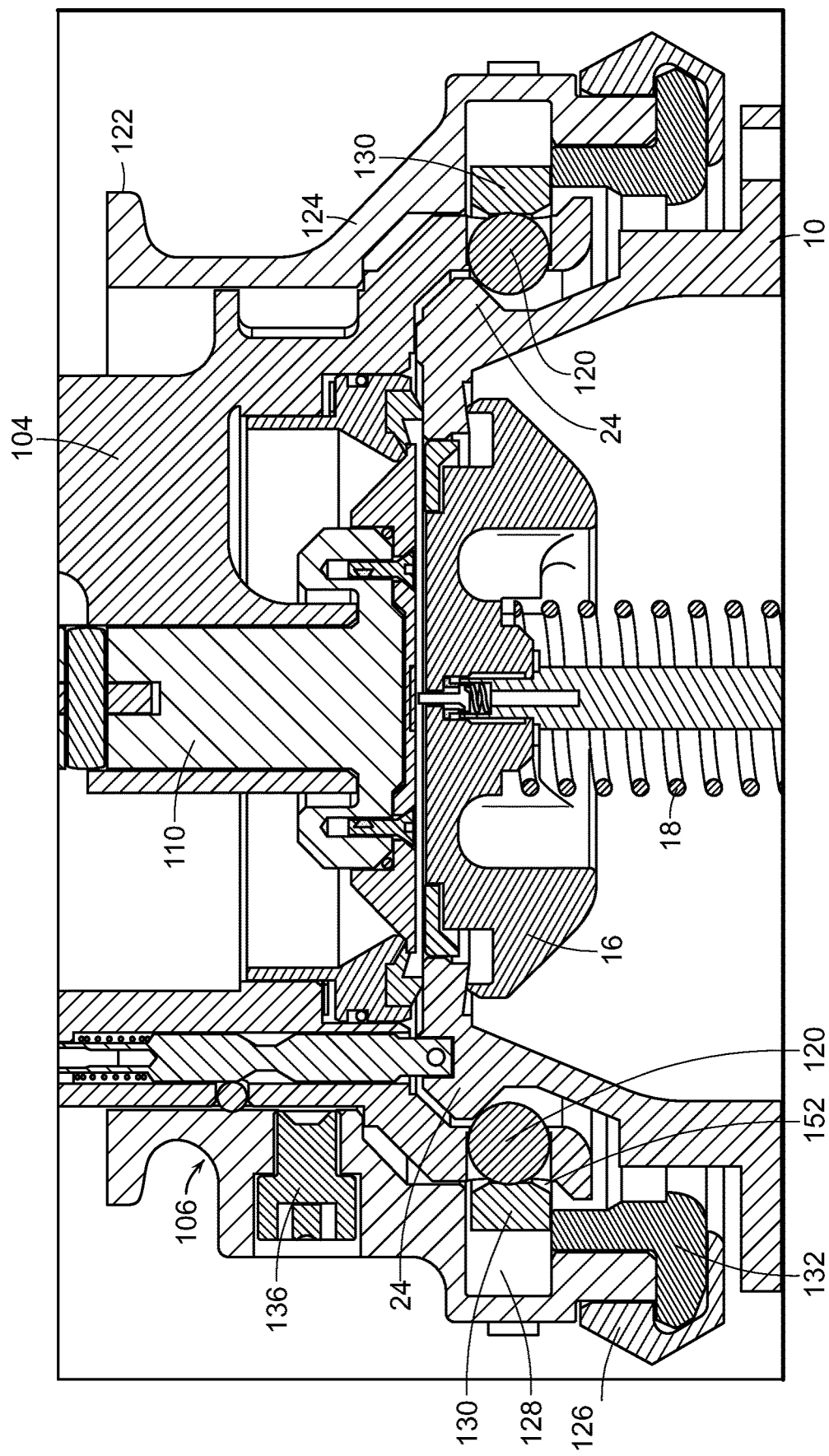
FIG. 9 is an enlarged cross-sectional view illustrating the locking of the coupler body assembly to a fluid hydrant, in accordance with the present invention.
Figure 10:
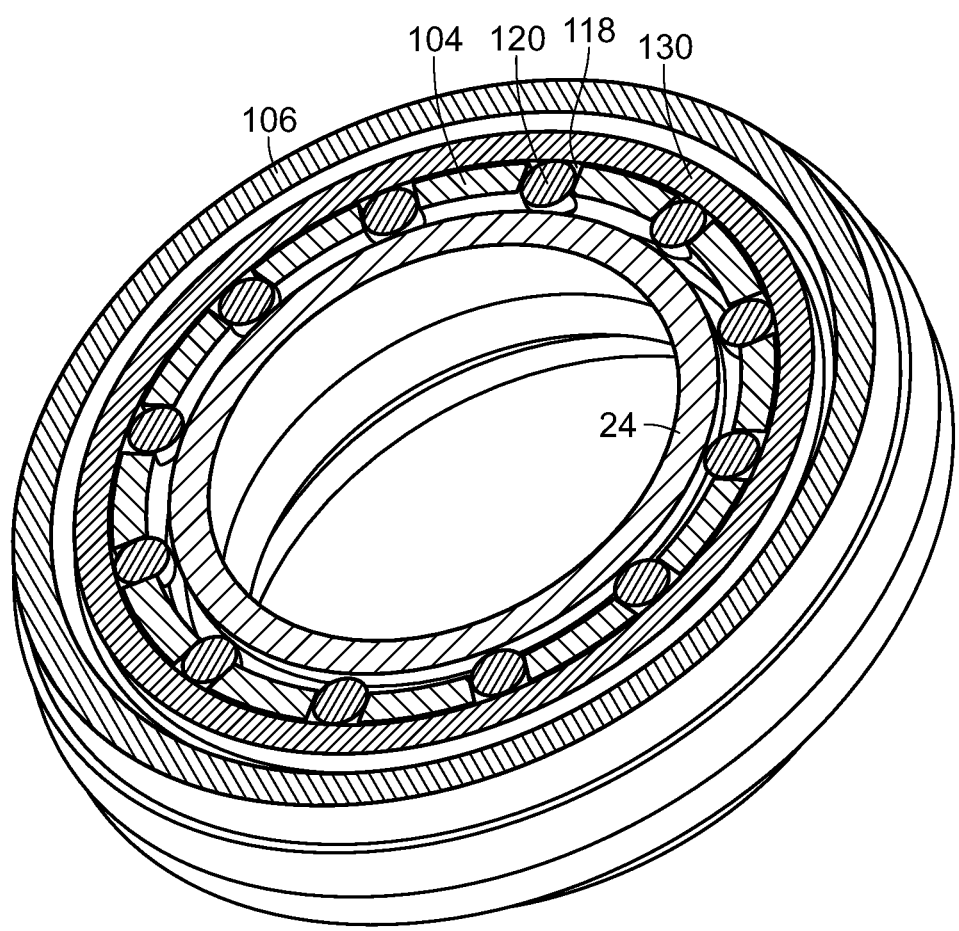
FIG. 10 is a cross-sectional view illustrating a plurality of first locking members in engagement with a portion of the fluid hydrant when in a locked position, in accordance with the present invention.

With reference now to FIG. 5, when the hydraulic coupler 100 is secured to the fluid hydrant valve 10, the coupler body assembly 104 is placed on the fluid hydrant valve 10, and if necessary the latching screw 136 is loosened and unlatched to allow the sleeve assembly 106 to be repositioned, such as by manually pushing the sleeve assembly 106 downwardly, until it engages ledge or stop 150. At this point, the fracture ring 130 is engaged with the locking balls 120, which are forced inward and under the rim or ledge 24 of the fluid hydrant 10. This position is illustrated in FIGS. 5, 9 and 10. The locking balls 120 are secured around and under the perimeter of the rim or flange 24 of the hydrant valve 10. When the sleeve assembly 106 is pushed downwardly, the locking balls 120 are forced inward under the lip of the flange as they ramp up a leading chamfer edge 152 of the fracture ring 130.

The cross-sectional view of FIG. 10 illustrates the first locking member balls 120 being moved inwardly in their cavity so as to engage the under surface of the rim or ledge 24 of the fluid hydrant. Fracture ring 130 holds the balls 120 in place, and thus the locking balls 120 serve as a first locking member and the fracture ring 130 serves as a second locking member, which cooperatively lock the coupler 100 to the hydrant.

Figure 11:
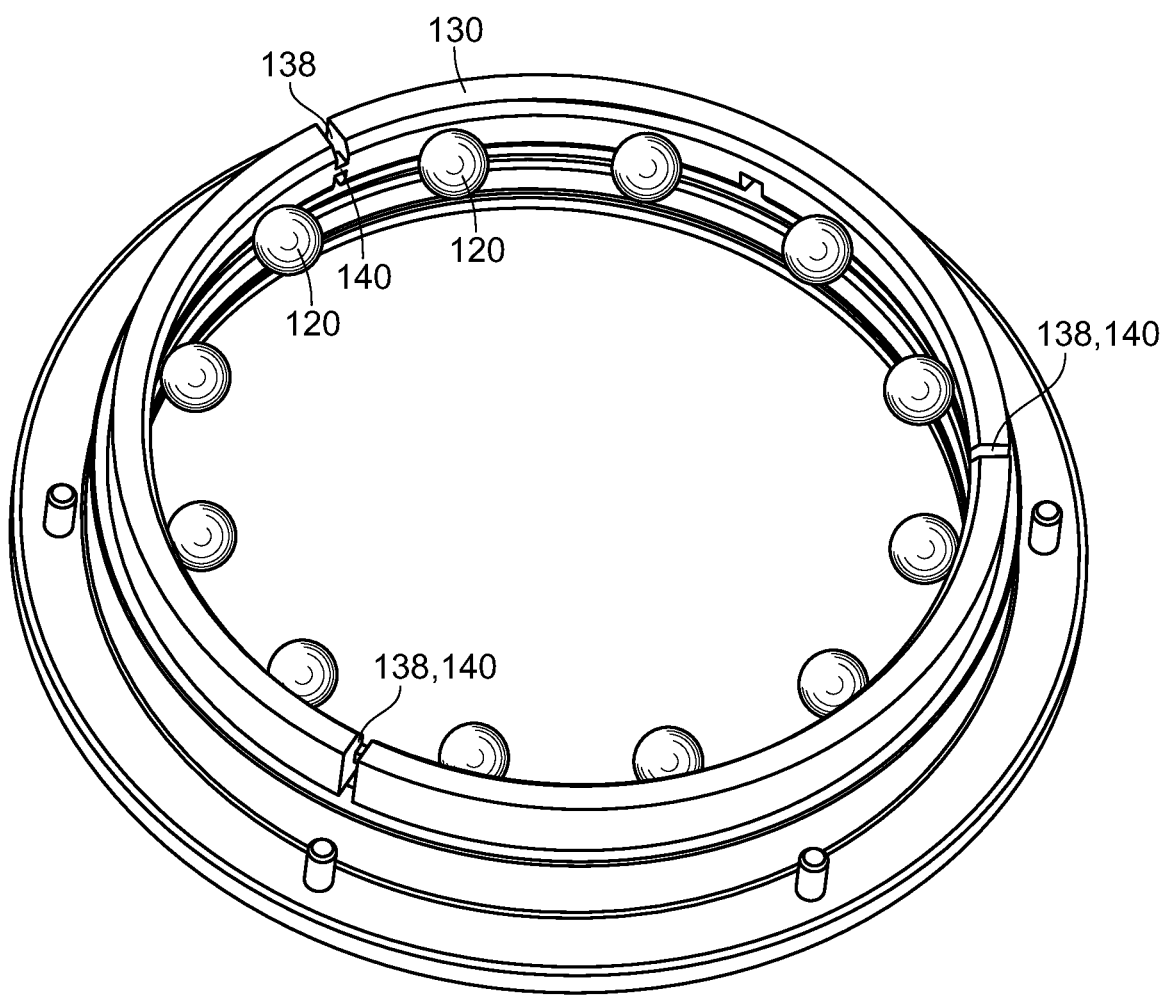
FIG. 11 is a top perspective view of a plurality of first lock members engaged with a fracture ring second lock member, in accordance with the present invention.

FIG. 11 illustrates the locking balls 120 being properly and evenly distributed with respect to the regions of weakness 138 and fracturable ligaments 140, such that the locking balls do not directly contact the regions of weakness 138 and fracturable ligaments 140, and preferably these are disposed substantially intermediate adjacent locking balls 120, as illustrated.

As the fluid, such as jet fuel, passes through the hydrant valve 10 and the hydraulic coupler 100, internal forces caused by the movement and pressure of the fluid do not directly impart forces, or indirectly impart a very nominal amount of force, to the fracture ring 130 as the fracture ring 130, and sleeve assembly, are not in direct contact with the pressurized fluid.

Figure 12:
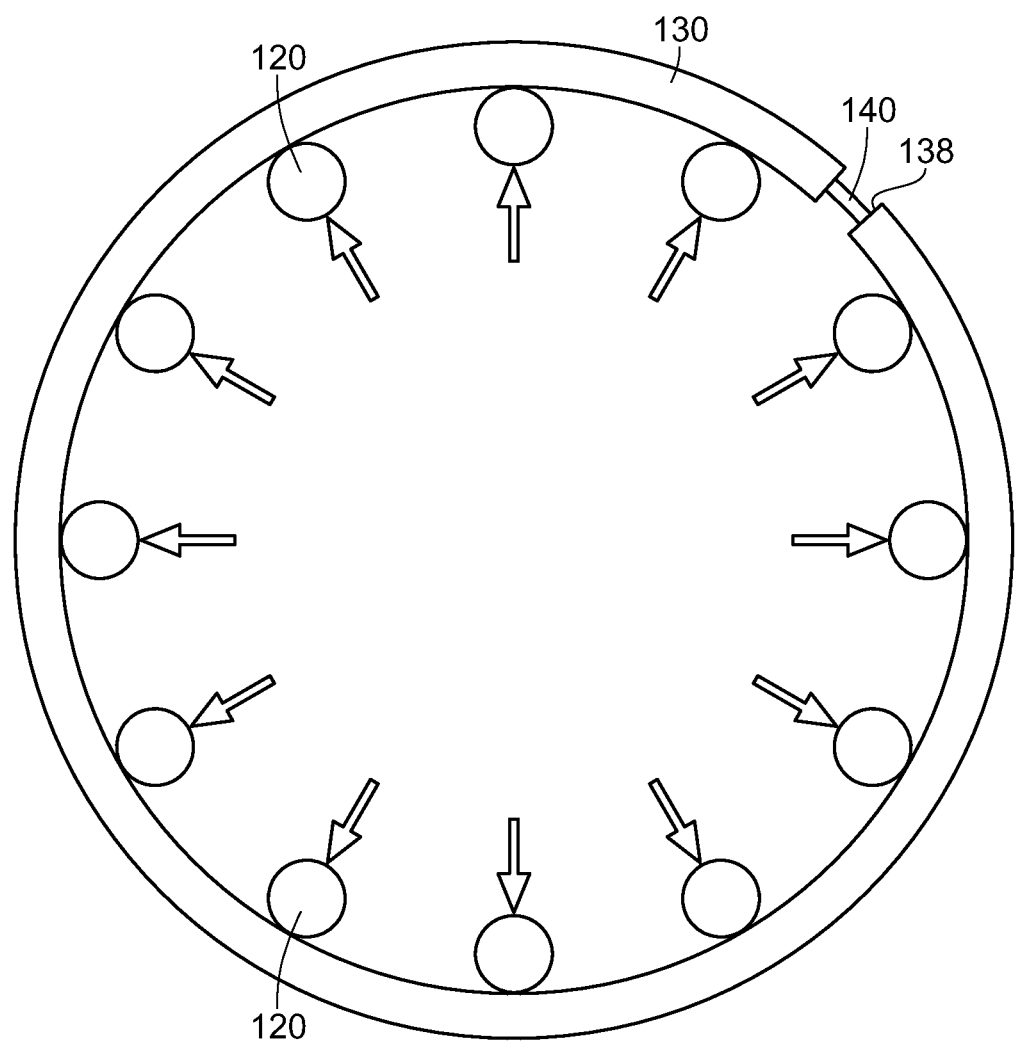
FIG. 12 is a diagrammatic view illustrating forces being applied to the fracture ring second lock member through the first lock members, in accordance with the present invention.
Figure 13:
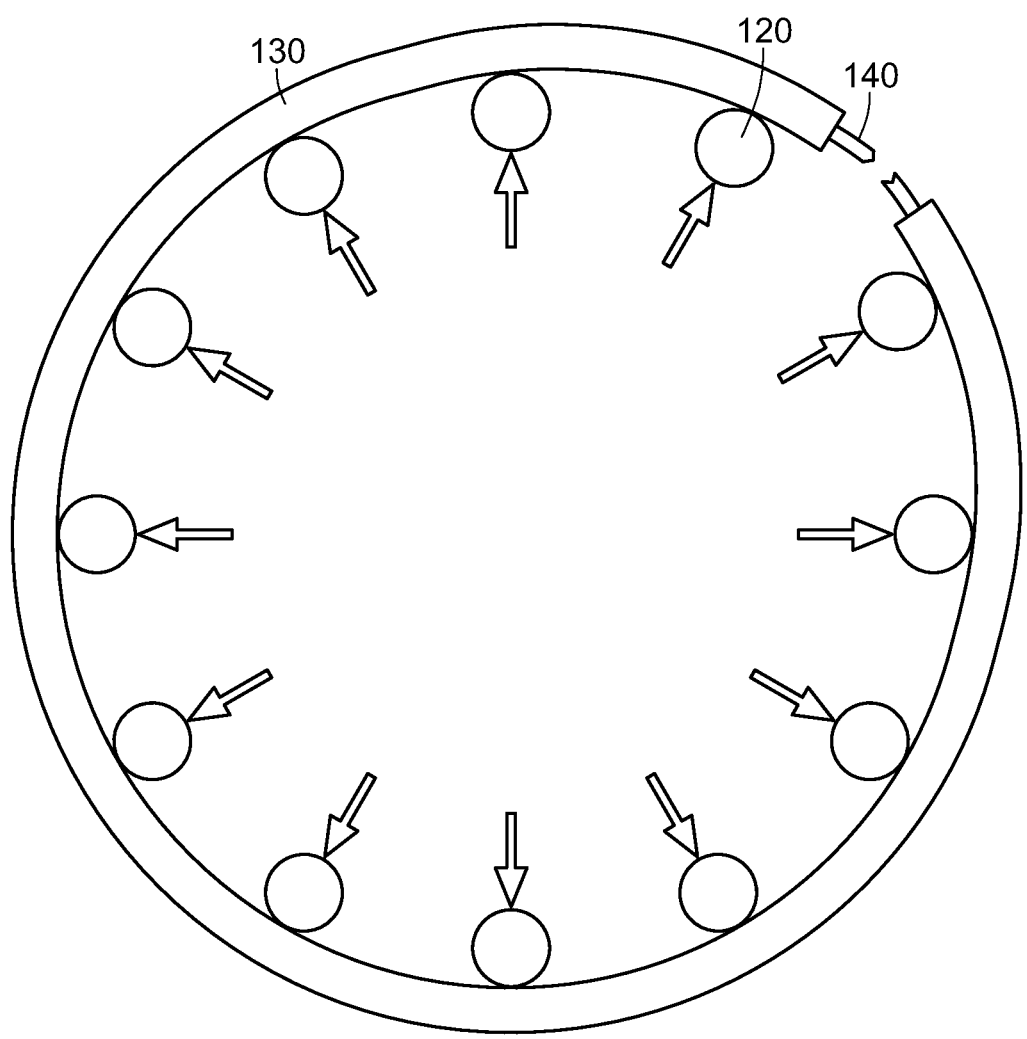
FIG. 13 illustrates the displacement of the fracture ring second lock member due to the forces applied thereto by the first lock members, in accordance with the present invention.

However, with reference now to FIGS. 12 and 13, when an external force is applied to the hydraulic coupler 100, such as when the hydraulic coupler experiences a pushing external load or a pulling external load which can be caused by a vehicle inadvertently running into the hydraulic coupler 100 or a vehicle driving away from a hydraulic coupler 100 which is coupled and attached to the fluid hydrant, those forces will create an imbalance and cause forces to be applied to the first locking member balls 120, at least some of which will move outwardly in response to the external load and forces applied to the hydraulic coupler 100 and thus impart forces to the fracture ring 130. When these forces exceed the predetermined amount, that is the strength of the ligament, the fracture ring 130 will displace, such as the fracture ligament 140 fracturing and breaking. This enables the locking balls 120 to continue to apply pressure to the second locking member fracture ring 130 and expand it outwardly into groove 128, allowing the first locking ball members 120 to further move outwardly and away from the rim or ledge 24 of the fluid hydrant valve and the hydraulic coupler to become unlocked and decoupled from the fluid hydrant valve 10.

It will be appreciated that although the force applied by the locking balls 120 to the retainer ring 130 are shown by directional arrows as being substantially equal, in actuality such forces may be unequal depending upon the direction and orientation of the external force being applied to the hydraulic coupler 100. Thus, these directional force arrows are for exemplary purposes only to show that one or more of the locking balls 120 would apply sufficient force to displace and break the fracture ring 130 when the external load exceeds a predetermined amount.

Although the fracture ring 130 is broken, the fluid hydrant 10 and pit valve components are not excessively damaged, and in most cases are not damaged whatsoever. As the fluid hydrants 10 are typically designed as automatic shutoff configurations, due to the biased nature of the poppet or member 16 by spring 18, very little fluid is spilled in this event as well.

As the fracture ring 130 is retained within groove 128 of the sleeve assembly 106, at least the fracture ring 130, and possibly the sleeve assembly 106 or even the entire hydraulic coupler 100 may need to be replaced. However, the cost and inconvenience of doing so is minimal compared to the damage and cost that would otherwise be experienced if the fluid hydrant and pit valve were damaged.

However, in the case of normal operation when an external force is not applied to the hydraulic coupler, after the fuel or other fluid is delivered, the valve is closed, such as by turning handle 108 and the sleeve assembly 106 is manually lifted upwardly to disengage the second locking member, in the form of the fracture ring 130, from the first locking member, in the form of the plurality of locking balls 120, to allow the locking balls 120 the freedom of movement to disengage and move over the edge or lip 24 of the fluid hydrant 10.

Although several embodiments have been described in detail for purposes of illustration, various modifications may be made without departing from the scope and spirit of the invention. Accordingly, the invention is not to be limited, except as by the appended claims.

What is claimed is:
1. A break-away hydraulic coupler, comprising:
  a coupler body assembly removably attachable to a fluid hydrant to form a fluid pathway therewith, the coupler body assembly having at least one first lock member movable between a locked position and an unlocked position;
  a sleeve assembly connected to the coupler body assembly and including a second lock member having a region of weakness, the second lock member being selectively movable into engagement with the at least one first lock member to move the at least one first lock member into a locked position to attach the coupler body to the fluid hydrant, and movable out of engagement with the at least one first lock member to allow the at least one first lock member to move into the unlocked position and permit the coupler body to detach from the fluid hydrant;
  wherein upon an application of a load external to the hydraulic coupler exceeding a predetermined amount, the at least one first lock member applies a sufficient force to the second lock member to cause the region of weakness of the second lock member to break and at least a portion of the second lock member to displace, allowing the at least one first lock member to move from the locked position to the unlocked position and the hydraulic coupler to detach from the hydrant; and
  wherein the second lock member comprises a fracture ring disposed within a groove of the sleeve assembly.

2. The hydraulic coupler of claim 1, wherein pressure forces caused by fluid flowing through the hydraulic coupler are not directly imparted, or are nominally imparted, to the second lock member.

3. The hydraulic coupler of claim 1, wherein the sleeve assembly is slidably connected to the coupler body so as to selectively move the second lock member into and out of engagement with the at least one first lock member.

4. The hydraulic coupler of claim 1, wherein the second lock member includes a plurality of spaced apart regions of weakness.

5. The hydraulic coupler of claim 4, wherein the regions of weakness are equally spaced apart from one another.

6. The hydraulic coupler of claim 4, wherein the second lock member is aligned relative to the at least one first lock member so as to evenly distribute a force from the at least one first lock member to the regions of weakness of the second lock member.

7. The hydraulic coupler of claim 1, wherein the region of weakness of the second lock member comprises a reduced cross-sectional area forming a fracturable ligament.

8. The hydraulic coupler of claim 1, wherein the at least one first lock member is at least partially disposed within a cavity of the coupler body assembly and at least partially extends out of the cavity as the at least one first lock member is moved into the locked position.

9. The hydraulic coupler of claim 8, wherein the at least one first lock member comprises a plurality of spaced apart first lock members, each at least partially disposed within a cavity of the coupler body assembly.

10. The hydraulic coupler of claim 9, wherein the first lock members have a spherical configuration.

11. The hydraulic coupler of claim 8, wherein the spaced apart first lock members are aligned with the second lock member such that the first lock members do not directly contact the region of weakness of the second lock member.

12. The hydraulic coupler of claim 11, wherein the region of weakness of the second lock member is positioned an equal distance between adjacent first lock members.

13. The hydraulic coupler of claim 1, wherein the strength of the region of weakness of the second lock member is calculated to break when a predetermined load is applied to the second lock member by the at least one first lock member.

14. A break-away hydraulic coupler, comprising:
a coupler body assembly removably attachable to a fuel pit valve hydrant to form a fluid pathway therewith, the coupler body assembly having a plurality of spaced apart first lock members movable between a locked position and an unlocked position, the lock members at least partially disposed within spaced apart cavities of the coupler body assembly and at least partially extending out of cavities and into engagement with the fuel pit valve hydrant as the first lock members are moved into the locked position;
a sleeve assembly connected to the coupler body assembly;
a second lock member comprised of a fracture ring disposed within a groove of the sleeve assembly and having a region of weakness defined by a reduced cross-sectional area calculated to break when a predetermined load is applied thereto;
wherein the sleeve assembly is slidably connected to the coupler body assembly to selectively move the fracture ring into engagement with the first lock members to move the first lock members into a locked position attaching the coupler body to the hydrant, and movable out of engagement with the first lock members to allow the first lock members to move into the unlocked position and permit the coupler body to detach from the hydrant; and
wherein upon an application of a load external to the hydraulic coupler exceeding a predetermined amount, at least one first lock member applies a sufficient force to the fracture ring to cause the region of weakness of the fracture ring to break and at least a portion of the fracture ring to displace, allowing the first lock members to move from the locked position to the unlocked position and the hydraulic coupler to detach from the hydrant.

15. The hydraulic coupler of claim 14, wherein pressure forces caused by fluid flowing through the hydraulic coupler are not directly imparted, or are nominally imparted, to the fracture ring.

16. The hydraulic coupler of claim 14, wherein the fracture ring includes a plurality of regions of weakness equally spaced apart from one another.

17. The hydraulic coupler of claim 16, wherein the fracture ring is aligned relative to the first lock members so as to evenly distribute a force from the first lock members to the regions of weakness of the fracture ring.

18. The hydraulic coupler of claim 14, wherein the region of weakness of the fracture ring comprising the reduced cross-sectional area forms a fracturable ligament.

19. The hydraulic coupler of claim 14, wherein the first lock members have a spherical configuration.

20. The hydraulic coupler of claim 14, wherein the first lock members are aligned with the fracture ring such that the first lock members do not directly contact the region of weakness of the fracture ring.

21. The hydraulic coupler of claim 14, wherein the region of weakness of the fracture ring is positioned an equal distance between adjacent first lock members.

22. A break-away hydraulic coupler, comprising:
a coupler body assembly removably attachable to a fluid hydrant to form a fluid pathway therewith, the coupler body assembly having at least one first lock member movable between a locked position and an unlocked position;
a sleeve assembly connected to the coupler body assembly and including a second lock member having a region of weakness, the second lock member being selectively movable into engagement with the at least one first lock member to move the at least one first lock member into a locked position to attach the coupler body to the fluid hydrant, and movable out of engagement with the at least one first lock member to allow the at least one first lock member to move into the unlocked position and permit the coupler body to detach from the fluid hydrant;
wherein upon an application of a load external to the hydraulic coupler exceeding a predetermined amount, the at least one first lock member applies a sufficient force to the second lock member to cause the region of weakness of the second lock member to break and at least a portion of the second lock member to displace, allowing the at least one first lock member to move from the locked position to the unlocked position and the hydraulic coupler to detach from the hydrant; and
wherein the at least one first lock member is at least partially disposed within a cavity of the coupler body assembly and at least partially extends out of the cavity as the at least one first lock member is moved into the locked position.

23. The hydraulic coupler of claim 22, wherein pressure forces caused by fluid flowing through the hydraulic coupler are not directly imparted, or are nominally imparted, to the second lock member.

24. The hydraulic coupler of claim 22, wherein the sleeve assembly is slidably connected to the coupler body so as to selectively move the second lock member into and out of engagement with the at least one first lock member.

25. The hydraulic coupler of claim 22, wherein the second lock member includes a plurality of spaced apart regions of weakness.

26. The hydraulic coupler of claim 25, wherein the regions of weakness are equally spaced apart from one another.

27. The hydraulic coupler of claim 25, wherein the second lock member is aligned relative to the at least one first lock member so as to evenly distribute a force from the at least one first lock member to the regions of weakness of the second lock member.

28. The hydraulic coupler of claim 22, wherein the region of weakness of the second lock member comprises a reduced cross-sectional area forming a fracturable ligament.

29. The hydraulic coupler of claim 22, wherein the second lock member comprises a fracture ring.

30. The hydraulic coupler of claim 29, wherein the fracture ring is disposed within a groove of the sleeve assembly.

31. The hydraulic coupler of claim 22, wherein the at least one first lock member comprises a plurality of spaced apart first lock members, each at least partially disposed within a cavity of the coupler body assembly.

32. The hydraulic coupler of claim 31, wherein the first lock members have a spherical configuration.

33. The hydraulic coupler of claim 31, wherein the spaced apart first lock members are aligned with the second lock member such that the first lock members do not directly contact the region of weakness of the second lock member.

34. The hydraulic coupler of claim 33, wherein the region of weakness of the second lock member is positioned an equal distance between adjacent first lock members.

35. The hydraulic coupler of claim 22, wherein the strength of the region of weakness of the second lock member is calculated to break when a predetermined load is applied to the second lock member by the at least one first lock member.

36. A break-away hydraulic coupler, comprising:
a coupler body assembly removably attachable to a fluid hydrant to form a fluid pathway therewith, the coupler body assembly having at least one first lock member movable between a locked position and an unlocked position;
a sleeve assembly connected to the coupler body assembly and including a second lock member having a region of weakness, the second lock member being selectively movable into engagement with the at least one first lock member to move the at least one first lock member into a locked position to attach the coupler body to the fluid hydrant, and movable out of engagement with the at least one first lock member to allow the at least one first lock member to move into the unlocked position and permit the coupler body to detach from the fluid hydrant;
wherein upon an application of a load external to the hydraulic coupler exceeding a predetermined amount, the at least one first lock member applies a sufficient force to the second lock member to cause the region of weakness of the second lock member to break and at least a portion of the second lock member to displace, allowing the at least one first lock member to move from the locked position to the unlocked position and the hydraulic coupler to detach from the hydrant;
wherein the second lock member includes a plurality of spaced apart regions of weakness; and
wherein the second lock member is aligned relative to the at least one first lock member so as to evenly distribute a force from the at least one first lock member to the regions of weakness of the second lock member.

37. The hydraulic coupler of claim 36, wherein pressure forces caused by fluid flowing through the hydraulic coupler are not directly imparted, or are nominally imparted, to the second lock member.

38. The hydraulic coupler of claim 36, wherein the sleeve assembly is slidably connected to the coupler body so as to selectively move the second lock member into and out of engagement with the at least one first lock member.

39. The hydraulic coupler of claim 36, wherein the regions of weakness are equally spaced apart from one another.

40. The hydraulic coupler of claim 36, wherein the region of weakness of the second lock member comprises a reduced cross-sectional area forming a fracturable ligament.

41. The hydraulic coupler of claim 36, wherein the second lock member comprises a fracture ring.

42. The hydraulic coupler of claim 41, wherein the fracture ring is disposed within a groove of the sleeve assembly.

43. The hydraulic coupler of claim 36, wherein the at least one first lock member is at least partially disposed within a cavity of the coupler body assembly and at least partially extends out of the cavity as the at least one first lock member is moved into the locked position.

44. The hydraulic coupler of claim 43, wherein the at least one first lock member comprises a plurality of spaced apart first lock members, each at least partially disposed within a cavity of the coupler body assembly.

45. The hydraulic coupler of claim 44, wherein the first lock members have a spherical configuration.

46. The hydraulic coupler of claim 43, wherein the spaced apart first lock members are aligned with the second lock member such that the first lock members do not directly contact the region of weakness of the second lock member.

47. The hydraulic coupler of claim 46, wherein the region of weakness of the second lock member is positioned an equal distance between adjacent first lock members.

48. The hydraulic coupler of claim 36, wherein the strength of the region of weakness of the second lock member is calculated to break when a predetermined load is applied to the second lock member by the at least one first lock member.

* * * * *